J. Old,
Journal Box.
Nº 5,027.    Patented Mar. 20, 1847.

Witnesses.
Alex Miller
Jas. W. Buchanan

Inventor
James Old

UNITED STATES PATENT OFFICE.

JAMES OLD, OF PITTSBURGH, PENNSYLVANIA.

BOX FOR JOURNALS.

Specification of Letters Patent No. 5,027, dated March 20, 1847.

*To all whom it may concern:*

Be it known that I, JAMES OLD, of the city of Pittsburgh, county of Allegheny, and State of Pennsylvania, have invented a new and useful machine or separate frame or shell or case to line or circle inside the common box for journals of shafts in machinery and with which to confine metals or alloys therein, and may be called "an improvement in journal-boxes"; and I do hereby declare that the following is a full, clear, and exact description of the construction and operation or method of application of the same, reference being had to the annexed drawings, making a part of this specification, in which—

Figure 1:
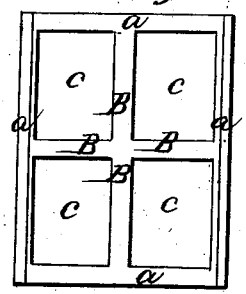
Figure 2:
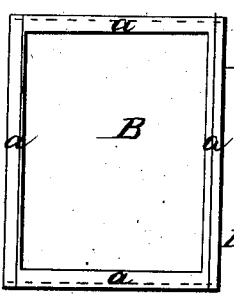
Figure 3:
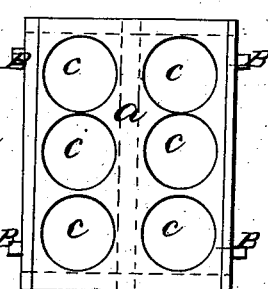
Figure 4:
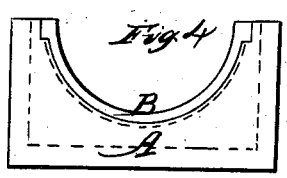
Figure 5:
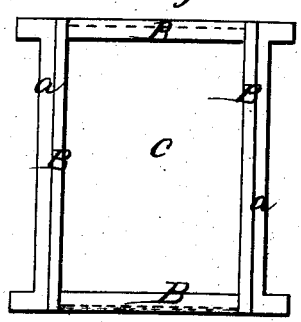

Figure 1 is a level view of the frame with cross bars, and pin or solder fastenings, letters A, representing the frame, B, the cross bars, and C, the open spaces for metals. Fig. 2 is a level view of the frame alone, with elevated fastenings, letters A, representing the frame, B, the open space for metals, and the dotted lines on each end, the elevated fastenings there—said fastenings cannot be seen on the sides as they are square down. Fig. 3 is a level view of the case or shell, with jogs and elevated fastenings, letter A being the whole dark surface, representing the case or shell, the dotted lines the elevated fastenings, letter B the jogs to be keyed or riveted in recesses on the sides of the box, and C, the openings for metals. Fig. 4 is an end view of a journal box showing an end view of the frame Fig. 2 fitted in it, letter A representing the box, letter B, the frame, and the dotted lines around the frame being a depression in the box for the elevated fastenings on the frame, and the offsets at the top of the frame representing the side fastenings. Fig. 5 is a level view of a journal box showing a level view of the frame Fig. 2 fitted in it, letter A representing the box, B, the frame, C, the open space for metals, and the dotted lines on the ends the elevated fastenings.

The construction and operation or method of application of the same is as follows, viz—It is a plain cast brass frame, or shell, or case, with holes, apertures, or openings, by boring, by cutting, by cross bars or without cross bars, or by any other way, and the whole of a size and proportions corresponding to the box into which it is to be fitted; and the same is then to be fastened into the box, by screws, or bolts, or pivots, or keys, or by depressions in the box for corresponding elevations on the frame, shell, or case, or by soldering, or by flanges on the ends to drop over the box, or by any other way suitable for mere fastening, and the metals then to be run into the openings.

What I claim as my invention, and desire to secure by Letters Patent is—

The making of a frame, shell or case (for confining metals or alloys) by itself, separate from the box for journals of shafts in machinery, and using the same for lining the box by fastening it in some way thereto, so that the same may be applied to every kind or shape of a box, whether of brass, iron, wood, or any thing else, and on or to plain surfaces, and so that when it is worn out it can be replaced thereon or thereto almost indefinitely by a new one, thereby causing a vast saving in the number and cost of boxes.

JAMES OLD.

Witnesses:
 ALEX. MILLER,
 JAS. W. BUCHANAN.